United States Patent

Millin

[15] 3,649,297
[45] Mar. 14, 1972

[54] IMPROVEMENTS RELATING TO FERMENTATION OF TEA

[72] Inventor: David J. Millin, Reading, England
[73] Assignee: Tenco Brooke Bond Limited, London, England
[22] Filed: Jan. 21, 1969
[21] Appl. No.: 792,255

[30] Foreign Application Priority Data

Jan. 23, 1968 Great Britain..........................3,625/68

[52] U.S. Cl..........................................................99/77
[51] Int. Cl..........................................................A23f 3/02
[58] Field of Search..........................................99/76, 77

[56] References Cited

UNITED STATES PATENTS

| | | | |
|---|---|---|---|
| 2,975,057 | 3/1961 | Seltzer et al. | 99/77 |
| 3,151,985 | 10/1964 | Fobes | 99/76 X |
| 3,392,028 | 7/1968 | Vuataz | 99/76 |
| 3,445,236 | 5/1969 | Gurkin | 99/76 |
| 3,477,854 | 11/1969 | Vuataz et al. | 99/76 X |
| 3,484,246 | 12/1969 | Moore | 99/76 |

FOREIGN PATENTS OR APPLICATIONS

| | | | |
|---|---|---|---|
| 596,135 | 4/1960 | Canada | 99/77 |
| 137,721 | 10/1960 | U.S.S.R. | 99/76 |
| 137,763 | 10/1960 | U.S.S.R. | 99/76 |

Primary Examiner—Frank W. Lutter
Assistant Examiner—Steven L. Weinstein
Attorney—John R. Martin

[57] ABSTRACT

An instant tea composition is produced by a process which comprises disintegrating green leaf, mixing the disintegrated leaf with water in a fermentation vessel having an inlet for introducing gas into the resulting suspension, introducing an oxygen-containing gas into the suspension at a controlled rate of flow, allowing fermentation to take place while controlling the concentration of dissolved oxygen, eliminating further enzyme activity upon completion of the desired fermentation and drying and resulting liquor.

13 Claims, 2 Drawing Figures

Inventor
DAVID J. MILLIN
By JOHN R. MARTIN
Attorney

FERMENTATION OF TEA

FIELD OF INVENTION

This invention relates to an instant tea composition. More specifically, the invention relates to an instant tea composition which is prepared directly from green leaf by a process that includes combining fermentation and extraction in a single operation.

DESCRIPTION OF THE PRIOR ART

Green tea includes freshly gathered tea leaves, tea leaves that have been freshly gathered and dried immediately, tea leaves that have been heat treated before drying and aqueous extracts of these leaves. In each instance, the green tea has undergone substantially no fermentation to the black state.

Black tea, on the other hand, is generally made from green tea leaf by subjecting tea leaves to a series of processing conditions including (1) withering, (2) rolling or otherwise disintegrating, (3) fermenting and (4) firing. Rolling or other disintegration initiates the enzymic reactions of fermentation, during which the characteristic color, flavor and aroma of black tea are developed. When the fermentation has progressed sufficiently the tea leaves are fired (i.e., dried). This arrests the enzymic reactions and the resulting product possesses the characteristic appearance of black tea. (see, for example, Millin, D. J. & Rustidge, D. W. (1967) Process BioChemistry 2 No. 6 page 9) Instant tea compositions normally are prepared from black leaf by extracting the black leaf either before or after drying.

SUMMARY OF THE INVENTION

It is an object of the present invention to prepare an instant tea composition directly from green leaf. It is a further object of the invention to prepare an instant tea composition directly from green leaf by a process that combines fermentation and extraction in a single operation. It is a still further object of the invention to conduct the combined processes of fermentation and extraction under controlled conditions. It is another object of the present invention to conduct the combined processes of fermentation and extraction with control of the concentration of dissolved oxygen present.

In accordance with the present invention there is provided a process for the preparation of an instant tea composition that comprises disintegrating green leaf, mixing the disintegrated leaf with water in a fermentation vessel having an inlet for introducing gas into the resulting suspension, introducing an oxygen-containing gas into the suspension at a controlled rate of flow to give a minimum concentration of dissolved oxygen of 10 percent of air saturation, allowing fermentation to take place while controlling the concentration of dissolved oxygen at the desired level, eliminating further enzyme activity upon completion of the desired fermentation and drying the resulting liquor.

The green tea leaf which is disintegrated prior to mixing with water in the fermentation vessel may be either freshly picked or withered. If freshly picked green leaf is used, it may prove desirable before allowing fermentation to proceed to hold the initial aqueous suspension for a suitable time at a given temperature in the absence of oxygen in order to allow the biochemical processes normally associated with withering to take place.

It is preferred that the concentration of dissolved oxygen that is maintained during the fermentation stage is 25 to 40 percent of air saturation at a barometric pressure of 760 mm. of mercury.

The enzyme activity upon completion of the desired fermentation preferably is eliminated by heating the resulting mixture. Heat to end enzyme activity may be supplied either before or after removal of insoluble materials.

The contents of the fermentation vessel are preferably discharged immediately after the fermentation has been completed and passed through a suitable device, such as a filter or basket centrifuge, to efficiently and rapidly remove the insoluble materials. Suitable variations in the filtering or centrifuging conditions at this stage may make it possible to control the amount of "cream" insoluble in cold water in the final product. The solution obtained is then immediately raised to a suitable temperature for an appropriate time to eliminate further enzyme activity. Alternatively, the temperature of the whole slurry may be raised to a suitable level prior to removal of the insoluble materials. If desired, the concentration of volatile substances may be adjusted during the process and the liquor from the process may be admixed with liquor obtained from other sources.

Drying of the resulting liquor may be accomplished by any suitable known means, for example, by spray-drying or freeze-drying.

The fermentation vessel used in the process of this invention preferably has an inlet for gas, e.g., air or oxygen, at or near its base, so arranged that the gas bubbles enter the suspension immediately below the stirrer. The preferred fermentation vessel also is provided with means for controlling the temperature of its contents. The rate of flow of gas and the speed of the stirrer are adapted to be adjusted to give a suitable concentration of oxygen in solution, the level of which would then be continually monitored.

The fermentation of tea in aqueous suspension is characterized by an uptake of oxygen at a rapid linear rate for a definite period during which the flavanols present in the green leaf are oxidized and otherwise transformed to yield orange pigments termed "theaflavins" and a variety of other products characteristic of black tea. At a point in time which corresponds with the virtual disappearance of the flavanols the rate of consumption of oxygen decreases rapidly and subsequently continues at only a low level. The time up to the point at which the rate of consumption of oxygen decreases may be referred to as the primary fermentation time (PFT).

In practice it has been found that the PFT depends upon the polyphenol oxidase activity and the amount of oxidizable substrate present in the leaf, the particle size of the disintegrated leaf, the total concentration of suspended solids, the concentration of dissolved oxygen and other physical aspects of the environment such as temperature and pH. The first two are natural variables and the next two are readily amenable to control. The concentration of dissolved oxygen depends upon the way in which the gas is supplied, the efficiency of the agitation and the geometry of the vessel. As a result of all these variables the PFT may lie anywhere between 10 minutes and 3 hours.

As the fermentation of tea proceeds theaflavins are formed. After a certain time these substances reach a maximum level and subsequently decline. It is known in the manufacture of black tea that the best teas are obtained by stopping the fermentation shortly after theaflavins begin to decrease. It has now been established that the PFT corresponds closely with the time when the theaflavins reach their maximum level. Thus fermentation times somewhat in excess of the PFT are desirable to obtain the best teas. It is therefore desirable to observe the PFT which may be conveniently achieved by continuous monitoring of the level of dissolved oxygen.

It also has been established that the production of theaflavins is greatly influenced by the equilibrium level of dissolved oxygen present during the reaction prior to the PFT. Thus the continuous monitoring and control of the dissolved oxygen concentration provides two aspects of quality control, namely control over the amount of theaflavins present in the final product and an accurate assessment of the most suitable fermentation time for each particular batch of material.

In the production of an instant tea composition the invention also provides a further aspect of the above process in which some of the chemical and biochemical reactions normally associated with the withering stage of conventional manufacture are carried out after comminution of the leaf. Thus, if, when the aqueous suspension is prepared, oxygen is excluded from the fermentation vessel for some time, some nonoxidative reactions, of significance in determining the final quality of the product, take place. Air or oxygen is then subsequently admitted to the desired level and the fermentation is carried out as usual. This whole procedure may be carried out within the fermentation vessel.

In carrying out the process of the present invention, it is also desirable to control the temperature and pH of the suspension and to trap and return to the suspension at least a proportion of the volatile substances which otherwise would be carried away by the stream of gas.

It also has been found that in some cases it may be advantageous to add hydrogen peroxide during the process. The use of hydrogen peroxide in small amounts, i.e., not more than 1 millimole per g. of tea solids, affords added control over the appearance of the product, particularly regarding improvement of the color to more closely resemble that of normal black tea. The hydrogen peroxide may be added to the suspension in any of the following ways:

i. continuously at a slow rate throughout the process;
ii. at various stages during the process; or
iii. at the end of the fermentation before the heating stage, this last method being preferred.

BRIEF DESCRIPTION OF THE DRAWINGS

For better understanding of the present invention together with other and further objects thereof, reference is made to the following specification and drawings in which.

DETAILED DESCRIPTION OF THE INVENTION

Figure 1:
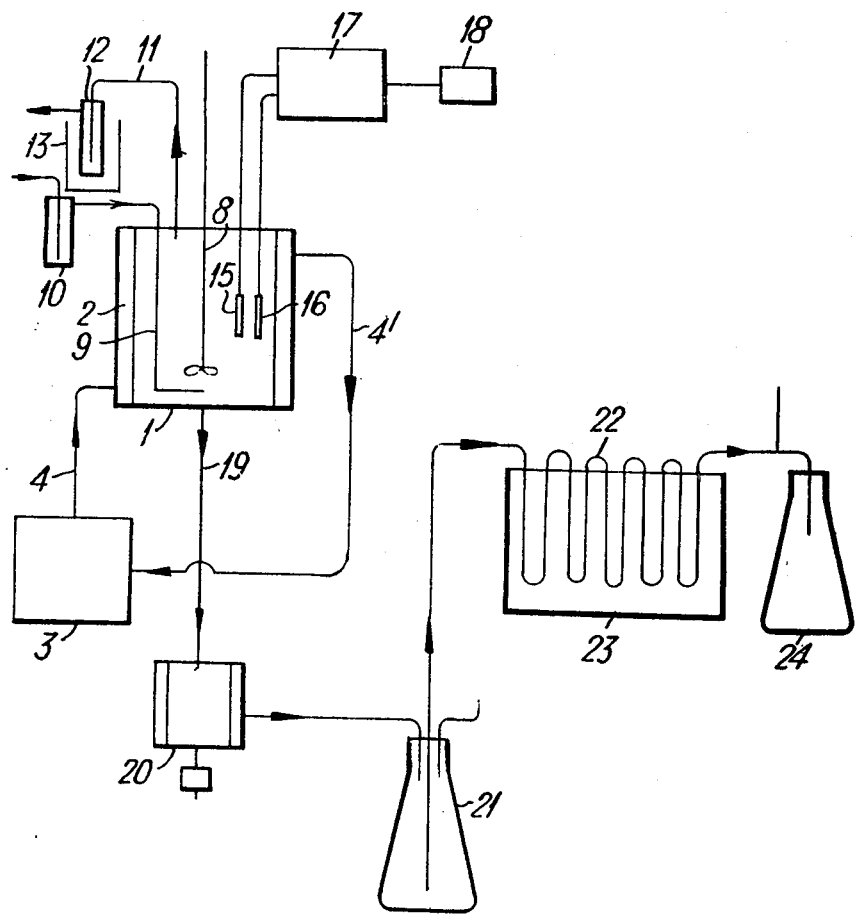
FIG. 1 is a schematic diagram of an apparatus suitable for carrying out the process of the present invention.

The invention will now be described with reference to a preferred embodiment and with reference to the drawings.

In this embodiment the fermentation is carried out in an enclosed cylindrical vessel fitted with a water jacket to provide temperature control and a gas inlet positioned immediately below the blades of a stirrer. The concentration of dissolved oxygen is controlled both by the rate of flow and composition of the gas stream and by the rate of stirring. The amount of oxygen in solution is measured by a dissolved oxygen meter (Model 15A, Electronic Instruments Limited), and the readings are fed to a recorder. The fermentation vessel is also fitted with a drain tap at its lowest point. The gases flowing out of the vessel during the reaction are conducted into a small volume of water contained in a tube immersed in ice, which acts as a trap for volatile materials. The volatile materials are subsequently returned to the vessel as described hereinafter.

The apparatus illustrated in the drawings comprises a fermentation vessel 1 which is cylindrical in shape with, for example, an internal diameter of 11 cm. and a depth of 15 cm. The vessel is fitted with an outer jacket 2 through which water from a thermostatically controlled bath 3 may be circulated via pipes 4, 4'. This serves to control the temperature of the contents of the vessel. The top of the vessel consists of a five-socket flat flange adapter. The base is a shallow glass dish 5 fitted with an outlet tap 6 in its center, and having a ground glass flange around its outer rim. A rubber gasket 7 fits between the base and the central part of the vessel and the component parts are clamped together between wooden plates held by tie bars (not shown).

The center socket of the lid is occupied by a stainless steel stirrer 8 with screw blades driven by a variable speed motor capable of 4,000 r.p.m. A gas inlet tube 9, for example of internal diameter 3 mm., is positioned immediately below the stirrer blades. The gas supply, compressed air or oxygen, passes through a wash bottle 10 containing water, before entering the vessel. This serves to saturate the gas with water vapor and permits an approximate adjustment of the flow rate by counting bubbles. The gas stream leaving the vessel through pipe 11 is conducted through a volatile trap 12 containing water and immersed in an ice bath 13.

Figure 2:
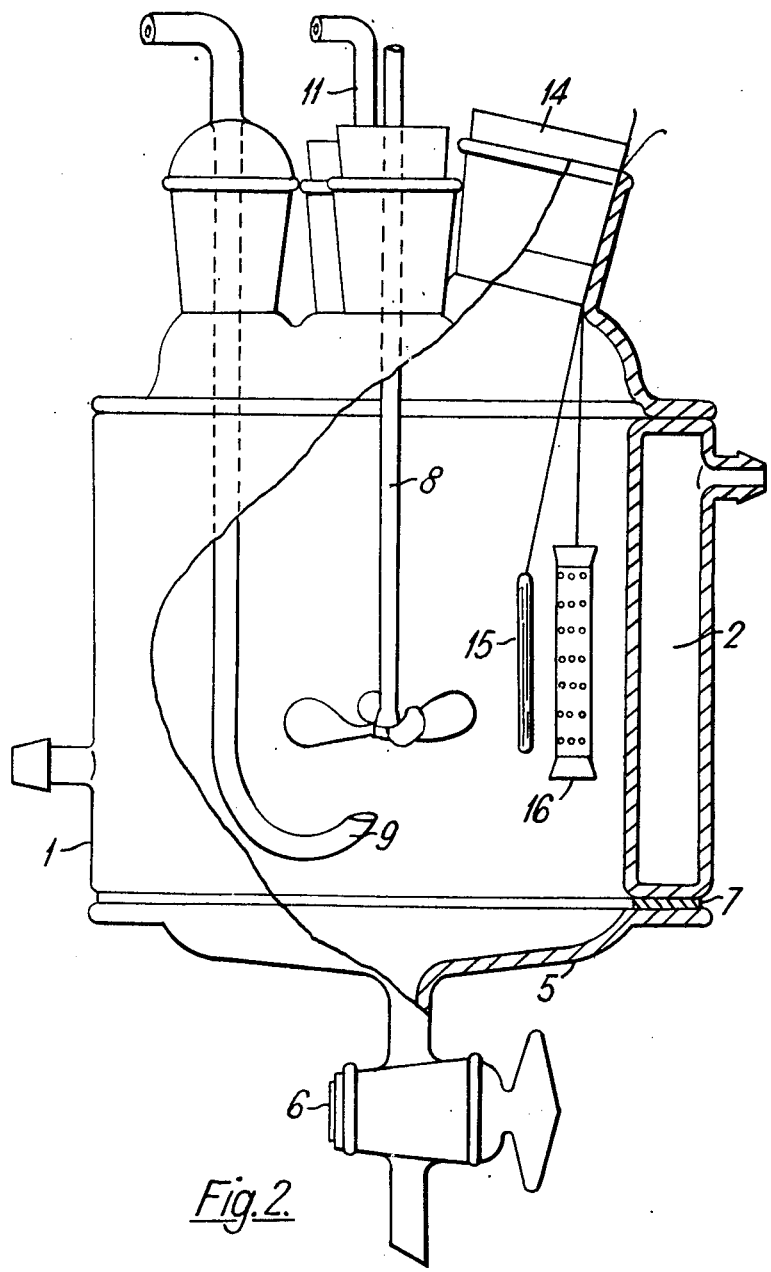
FIG. 2 is a more detailed representation of the fermentation vessel in partial section.

The largest socket is closed by a tightly fitting rubber stopper 14 having two grooves just sufficient to carry the leads from two probes 15 and 16 which record temperature and oxygen, respectively. The oxygen monitor comprises the probe 16, which is an electrode system as illustrated in FIG. 2, and a meter 17 incorporating a temperature compensating circuit. The electrode system 16 comprises a lead anode encased in porous polyvinyl chloride and surrounded by a cylindrical perforated cathode of silver. The whole cell is sheathed in a polyethylene membrane and the electrolyte is saturated potassium bicarbonate. Oxygen diffusing through the membrane is reduced at the cathode and generates a current proportional to the partial pressure of oxygen in the surrounding liquid. This instrument is robust, gives a high-output current and, provided the membrane remains intact, has a long life and suffers very little drift. However, it suffers from a relatively large temperature coefficient. This is automatically compensated by the meter and the temperature probe 15 mounted alongside the oxygen sensor. A selector switch enables either the level of dissolved oxygen (expressed as percent air saturation) or the temperature to be read. In addition a continuous record of the oxygen concentration is provided by feeding the appropriate output to an Amprobe miniature point recorder 18.

The fifth socket in the lid of the fermentation vessel is normally stoppered. However, it may be used for inserting another probe, e.g., for pH measurement, or, if necessary, for the addition of other desired materials, such as an antifoam. From the outlet tap 6 at the bottom of the fermentation vessel a pipe 19 leads to a basket centrifuge 20. The remaining equipment consists of a small holding reservoir 21, a series of glass coils 22 immersed in a water bath 23 and functioning as a heat exchanger, and a final collecting reservoir 24.

In carrying out the process of the invention, the concentration of dissolved oxygen is adjusted to the desired level at the start of the fermentation reaction, the preferred level of concentration being 25 to 40 percent of air saturation. At a fixed gas flow rate and a fixed stirrer speed this level then remains constant or nearly so until the bulk of the oxidative reactions have been completed (30 to 50 minutes). The demand for oxygen by the slurry then decreases; consequently the level of dissolved oxygen increases. This increase is usually quite sharp and definite and is readily detectable on the recorder. Some minutes after this increase is observed the airflow is switched off and the contents of the volatile trap are returned to the vessel. The suspension is then discharged through a basket centrifuge and heat exchanger, not necessarily in that order. The insoluble residue is further extracted with hot water and a proportion of the combined liquors evaporated to adjust the volatile level, recombined and subsequently dried, for example, by freeze-drying.

The following examples illustrate specific embodiments of the present invention.

EXAMPLE 1

Minced green leaf (250 g.) and water (800 ml. preheated to give a temperature of 25° C. when mixed with the leaf) were placed in a fermentation vessel. The temperature was maintained at 25° C. and the level of dissolved oxygen adjusted to 25° percent of air saturation. After 40 minutes a sharp increase in dissolved oxygen was noted and 10 minutes later the contents of the vessel were discharged through a basket centrifuge and the liquor brought to 80° C. by passage through a series of coils immersed in boiling water and functioning as a heat exchanger. Sixty-five percent by volume of the liquor was concentrated to one-tenth of its original volume by evaporation, recombined with the remaining liquor and freeze-dried.

EXAMPLE 2

In a series of experiments, withered minced green leaf (145 g.) and water (900 ml.) were mixed together in a fermentation vessel. The level of oxygen in solution was adjusted to the desired value by appropriate regulation of the gas flow and stirrer speed. The fermentation and subsequent processing were carried out in the manner described in Example 1. The fermentation times observed and the proportion of theaflavins obtained in the final product were as follows:

| Oxygen concentration (% of air saturation) | PFT (Minutes) | Proportion of total color represented by theaflavins (%) |
| --- | --- | --- |
| 5 | 170 | 26.9 |
| 15 | 66 | 36.1 |
| 30 | 24 | 50.6 |
| 50 | 17 | 58.4 |
| 70 | 15 | 61.4 |

EXAMPLE 3

Minced fresh green leaf (200 g.) and minced tea bush prunings (50 g.) were mixed with water (800 ml.) and the fermentation and subsequent processing carried out according to the method of Example 1. The final product had 41 percent of its color attributable to theaflavins and was judged to be far superior to a mixture, in the appropriate proportions, of powder obtained by a similar processing of the individual components in isolation.

EXAMPLE 4

This example illustrates the effect of adding a small amount of hydrogen peroxide.

Minced withered green leaf (170 g.) was suspended in water (850 ml.) and fermented according to Example 1 at a dissolved oxygen concentration of 25 percent of air saturation. After 15 minutes, hydrogen peroxide (15 ml. of 1.82 M) was slowly introduced, the complete addition occupying a further 20 minutes. During this time the dissolved oxygen level was maintained at 25 percent of air saturation. The mixture was then subsequently processed according to Example 1 and the colored substance examined by chromatography on alkylated Sephadex (Crispin, Payne and Swaine, J. Chromatography (1968) Vol. 37, page 118), with the following results:

| | Non dialysable color (% of total extinction at | theaflavins 380 nm.) |
| --- | --- | --- |
| Sample + hydrogen perioxide | 22 | 12 |
| Control sample no hydrogen peroxide | 4 | 30 |
| Typical black tea | 30 | 16 |

The process provided by the present invention enables instant tea to be prepared directly from green leaf by combining the processes of fermentation and extraction in a single operation and conducting the operation under controlled conditions, particularly with regard to the concentration of dissolved oxygen present in the reaction vessel. In the process of this invention the fermentation is carried out in the liquid phase and the process has been designated "slurry fermentation."

Since the fermentation is carried out in the liquid phase it allows considerable control to be exercised over the process and makes it possible for inferior leaf and hitherto unacceptable materials to be processed into reasonable products.

Although the invention has been described in detail in the foregoing specification, it is to be understood that those skilled in the art will recognize variations that do not depart from the spirit and scope of the invention and this invention is not intended to be limited except as defined by the following claims.

What is claimed is:

1. A process for the preparation of an instant tea composition that comprises disintegrating green leaf, mixing the disintegrated green leaf with water in a fermentation vessel having an inlet for introducing gas into the resulting suspension and an outlet for venting emitted volatile substances from the vessel, stirring the suspension, introducing an oxygen-containing gas into the suspension at a controlled rate of gas flow and with stirring adjusted to give a minimum concentration of dissolved oxygen of 10 percent of air saturation, allowing fermentation to take place while the concentration of dissolved oxygen remains at the desired level, determining the optimum fermentation time by monitoring an increase in the level of dissolved oxygen in the suspension, removing insoluble materials, eliminating further enzyme activity upon completion of the desired fermentation, either after or before removal of insoluble materials and subsequently drying the final liquor.

2. A process according to claim 1 which comprises maintaining the concentration of dissolved oxygen during the fermentation stage at 25 to 40 percent of air saturation at a barometric pressure of 760 mm. of mercury.

3. A process according to claim 1 in which the final liquor is dryed by spray-drying.

4. A process according to claim 1 in which the final liquor is dryed by freeze-drying.

5. A process according to claim 1 which comprises removing insoluble materials by passing the contents of the fermentation vessel through a centrifuge after fermentation has been completed.

6. A process according to claim 1 which comprises controlling the temperature and pH of the suspension in the fermentation vessel.

7. A process according to claim 1 in which the initial aqueous solution is held in the absence of oxygen to allow the biochemical process normally associated with withering to take place before the solution is contacted with oxygen for the fermentation.

8. A process according to claim 1 which comprises trapping and returning to the suspension at least a proportion of the volatile substance emitted during the process.

9. A process according to claim 1 which comprises adjusting the concentration of volatile substances following a discharge from the fermentation vessel.

10. A process according to claim 1 which comprises adding hydrogen peroxide to the suspension.

11. A process according to claim 10 which comprises adding the hydrogen peroxide before further enzyme activity is eliminated.

12. A process according to claim 10 which comprises adding no more than 1 millimole of hydrogen peroxide per gram of tea solids.

13. A process according to claim 1 in which further enzyme activity is eliminated by heating.

* * * * *